(No Model.)

A. W. WALKER.
ANIMAL TRAP.

No. 283,171. Patented Aug. 14, 1883.

Witnesses
W. R. Edelen
Robt. H. Porter

Inventor.
A. W. Walker
Per. Nullock & Nallock
Att's

UNITED STATES PATENT OFFICE.

ADDISON W. WALKER, OF ERIE, PENNSYLVANIA, ASSIGNOR TO THE LOVELL MANUFACTURING COMPANY, (LIMITED,) OF SAME PLACE.

ANIMAL-TRAP.

SPECIFICATION forming part of Letters Patent No. 283,171, dated August 14, 1883.

Application filed November 21, 1881. (No model.)

*To all whom it may concern:*

Be it known that I, ADDISON W. WALKER, of Erie, Erie county, Pennsylvania, have invented new and useful Improvements in Animal-Traps; and I do hereby declare that the following is a full, clear, and exact description thereof, reference being had to the accompanying drawings and the letters or figures of reference marked thereon.

My invention relates to that class of animal-traps wherein the animal, as he enters the trap, steps upon a tilting platform, and thereby closes the door behind him, which will remain closed as long as the animal remains upon the platform, but when he steps off the platform into another compartment of the trap the door opens and the trap is reset automatically.

My invention consists in providing improvements in the construction of the said tilting platform and door.

Figure 1:
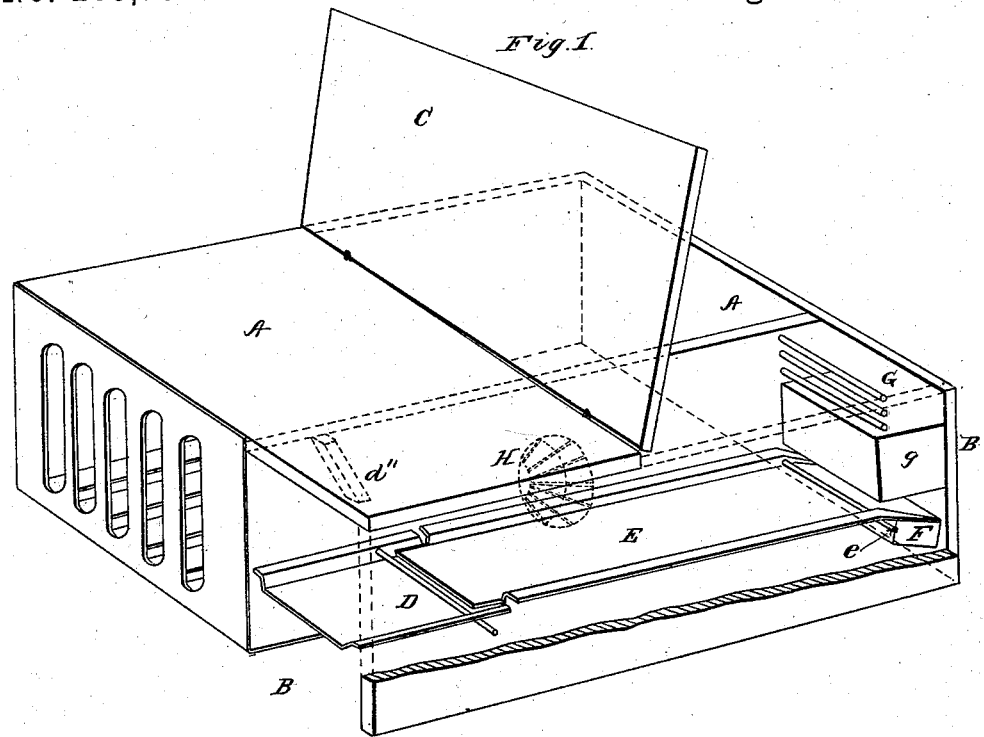
Figure 2:
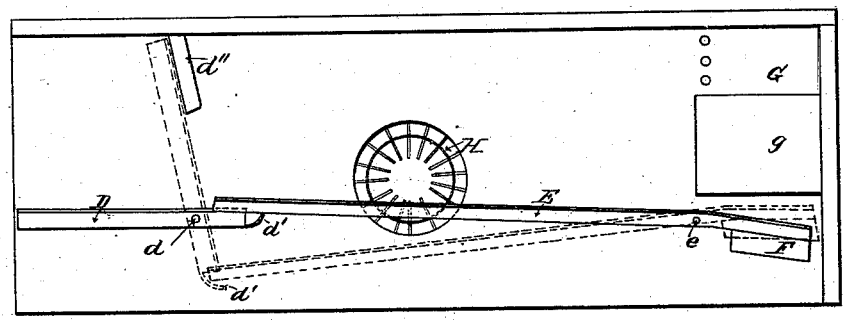
Figure 3:
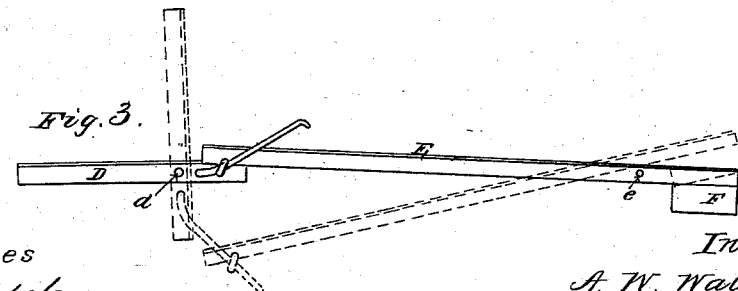

My device is shown in the accompanying drawings, as follows:

Figure 1 is a perspective view of the trap with parts broken away. Fig. 2 is a side elevation with the sides removed. Fig. 3 is an alternative construction.

A is the cage-compartment of the trap. B is the passage-way or entrance-way compartment of the trap. C is the lid of the cover of the trap. D is the door; E, the tilting platform; F, the weight or counter-balance on the platform; G, the bait-box, and $g$ a block forming the bottom of the bait-box. H is the passage into the cage.

All that is new in my construction is in the construction and arrangement of the platform and door. The platform is pivoted near the bait-box at $e$, and its long end rests upon the short end of the door, which is pivoted at $d$. The short end of the door is turned up, as at $d'$, so as to form a catch to limit the downward movement of the platform. A lug or jamb, $d''$, stops the upward movement of the door. The door and the platform together form the floor of the passage-way. An animal entering the trap passes over the door and onto the platform, and his weight then sinks the platform and throws up the door, closing it. When the animal passes through the passage H, the platform and door return to their former position by the action of the weight F.

If it is found desirable to have the door, when thrown up, come to a vertical position in place of being nearly so, as shown in Fig. 2, it will be advisable to link the door and the platform together, so that the upward movement of the platform will be sure to throw down the door. When the door is set, as shown in Fig. 2, when up, it falls down of its own weight when the platform goes up; but when linked together, as shown in Fig. 3, it will be compelled to fall by the weight of the counter-weight F. It is necessary that there be a jamb or lug for the door to strike upon, so as to not be thrown back too far, especially when constructed as is shown in Fig. 2.

What I claim as new is—

1. In an animal-trap, the tilting platform E, in combination with a tilting door, D, having its short end turned up, substantially as described, to serve as a stop for said platform.

2. The tilting door D, pivoted at $d$, and having its short end turned up, as at $d'$, in combination with the tilting platform E and jamb $d''$, substantially as shown.

In testimony that I claim the foregoing I have hereunto set my hand this 16th day of November, 1881.

ADDISON W. WALKER.

Witnesses:
JNO. K. HALLOCK,
ROBT. H. PORTER.